United States Patent

[11] 3,551,604

[72] Inventor Amos E. Joel, Jr.
South Orange, N.J.
[21] Appl. No. 802,440
[22] Filed Feb. 26, 1969
[45] Patented Dec. 29, 1970
[73] Assignee Bell Telephone Laboratories Incorporated
Murray Hill, N.J.
a corporation of New York

[54] IMMEDIATE RINGING IN A STEP-BY-STEP TELEPHONE SYSTEM
8 Claims, 3 Drawing Figs.

[52] U.S. Cl. .......... 179/18
[51] Int. Cl. .......... H04m 3/04
[50] Field of Search .......... 179/18.82
No References Cited

*Primary Examiner*—Kathleen H. Claffy
*Assistant Examiner*—Thomas W. Brown
*Attorneys*—R. J. Guenther and James Warren Falk

ABSTRACT: A circuit is disclosed for providing immediate ringing to telephone lines in a step-by-step central office. The connectors of the step-by-step network are subdivided into three groups with each group receiving ringing of a different phase from a three-phase ringing generator. As each ringing phase is activated, its associated connector subgroup becomes "preferred" for seizure. The nonpreferred groups have ground imposed on their sleeve leads to reflect an artificial "busy" condition to the final selector which picks the idle connector through which the call is to be completed. This insures the seizure of only a connector in that subgroup which will obtain the appropriate phase of ringing when the connector completes the call. Should all connectors of the preferred subgroup actually be busy, ground is removed from the nonpreferred subgroups to permit seizure of any idle connector.

INVENTOR
A.E. JOEL, JR.
BY Howard C. Popper
ATTORNEY

IMMEDIATE RINGING IN A STEP-BY-STEP TELEPHONE SYSTEM

BACKGROUND OF THE INVENTION

This invention relates to telephone switching systems and more particularly to the equipment for applying the ringing signal to a called telephone.

The ringing signal for most telephone switching systems, a repetitive cycle comprising a 2-second active A-C ringing burst and a 4-second "silent" pause, is generated by multiphase rotating machinery from which a plurality of similar, but phase displaced signal outputs may be obtained. To balance the load on the ringing generator, the switching train connectors of the telephone central office, to which the ringing signal outputs are applied, are conventionally grouped so that each output phase of the ringing generator is connected to approximately even numbers of connectors.

In the normal operation of a switching train, receipt of the hundreds digit of the called number operates a final selector which then hunts for an available connector through which the call is completed in response to the tens and units digits. When the selected connector completes the call in response to the units digit, if it is found that the called telephone is on-hook, a connection is made to the ringing generator. At times, however, this connection will be made during the silent portion of the ringing signal and the connection to the ringing generator may in some cases be established for as long as 4 seconds before ringing of the called line even begins. Since billing commences only when the called subscriber goes off-hook, a connection during the silent portion of the ringing signal not only is nonrevenue producing but will also reduce the overall speed of service provided in the system.

It is therefore an object of my invention to reduce the time delays encountered in alerting a called subscriber to the completion of an incoming call to his telephone.

Another object is to improve the arrangements for ringing in a telephone system by reducing the holding times for ringing and switching equipment associated with the extension of each call thereby providing faster service than that presented by prior systems.

SUMMARY OF THE INVENTION

These and other objects of my invention are achieved, in one illustrative embodiment, by grouping the connectors of a step-by-step central office into a plurality of subgroups corresponding to the plurality of differently phased ringing outputs available from the ringing generator. By artificially busying the connectors of all subgroups except the one subgroup which will present the active portion of its ringing cycle to a called line connected thereto, the completion of an incoming call through a connector having a ringing cycle of the proper phase to provide immediate ringing is insured. However, should all connectors in this excepted subgroup be actually busy, the artificial busy condition is removed from the remaining subgroups and the call is completed through any idle connector in a conventional manner.

In accordance with one aspect of my invention, I take advantage of the average expected time lapse between the seizure of a connector and the completion of its response to the tens and units digits of the called number to prevent the seizure of a connector in any group but the one group whose associated ringing phase output will be in the active portion of its cycle at the expiration of the time lapse. In one illustrative embodiment this feature is achieved by providing, on the shaft of the ringing generator, additional offset switch cams displaced by an amount corresponding to the above-mentioned average expected time lapse.

In the illustrative embodiment described, a three-phase ringing generator is connected to three connector subgroups and the duration of the active portion of each ringing phase is assumed to be one-half the duration of the silent interval for that phase.

BRIEF DESCRIPTION OF THE DRAWING

The foregoing and other objects of the invention may be more readily comprehended from an examination of the following specification, the appended claims and drawing in which:

GENERAL DESCRIPTION

Figures 1, 2:
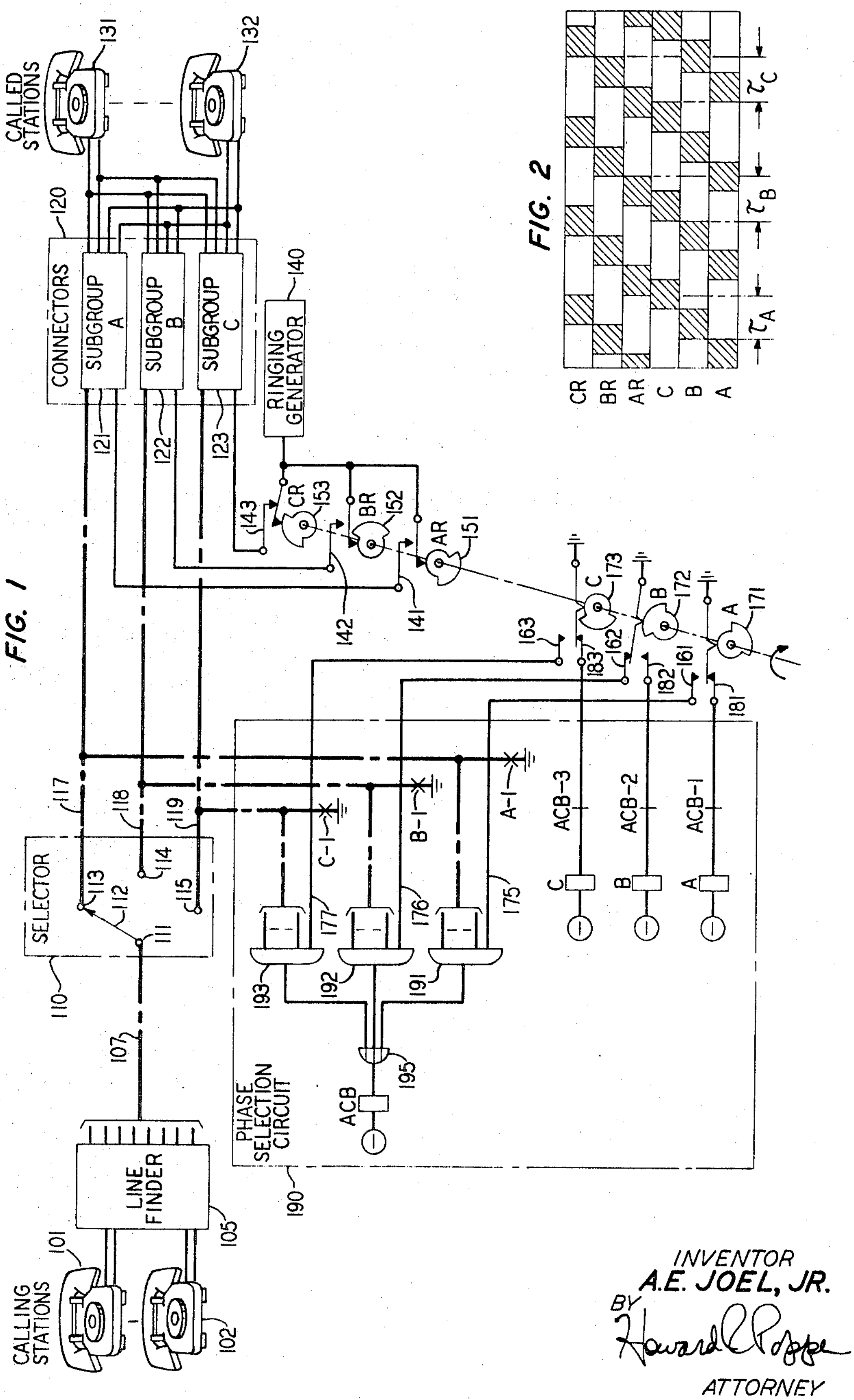
FIG. 1 shows a step-by-step central office arranged for immediate ringing using a specific illustrative embodiment of my invention.
FIG. 2 shows the phase relationship among signal and control outputs of the ringing generator.

Referring now to FIG. 1, there is shown a step-by-step central office. Its connectors 120 at the right side of the FIG. are divided into three subgroups 121, 122 and 123 each connected to a different one of the three phase displaced ringing outputs from ringing generator 140. As in the prior art, the division of connectors among the ringing outputs is made to equalize phase loading on the generator. However, in the present invention, the two subgroups whose associated ringing outputs would be in the silent portion of their cycle some predetermined time interval later when the response of their connectors to a called number would be completed are made artificially busy by phase selection circuit 190 to prevent their being seized. In this manner, the connector which can be seized will be one from the subgroups having ringing of the proper phase to provide active ringing immediately upon completion of the extension of a switching train connection to the called line. When all of the connectors of the "in-phase" subgroup are actually busy, phase selection circuit 190 is arranged to inhibit the artificial busying of the "out-of-phase" groups, thereby permitting a call to be completed through any idle connector.

DETAILED DESCRIPTION

When one of the plurality of calling stations 101 through 102 in FIG. 1 goes off-hook to initiate a call, that off-hook condition is detected in the conventional manner by equipment in the central office. Thereafter a switching train connection is extended through line finder 105 and the intermediate portions of switching train 107 (represented by the cabled leads) to final selector 110 which selects an idle trunk in one of trunk groups 117, 118, or 119. For simplicity, only one terminal, the sleeve terminal, has been shown in selector 110 for each such trunk group. In the conventional operation of final selector 110, switch arm 112 rotates among the group of sleeve terminals 113 until an ungrounded terminal is reached corresponding to an idle trunk in trunk group 117. If no ungrounded sleeve terminal is found in sleeve terminal group 113, rotation continues through sleeve terminal groups 114 and 115. When an idle trunk is found in one of trunk groups 117, 118, or 119, it is seized in the conventional manner and the tens and units digits of the called telephone number are applied by the seized trunk to one of the connectors of subgroups 121, 122, or 123 corresponding to the seized trunk group. The selected connector responds to the tens and units digits to select one of the multiple appearances of the called telephone and, if that telephone is idle, applies ringing from its respective one of the three phases AR, BR, or CR of generator 140. The three ringing phases, one of which is connected to each of connector subgroups 121, 122, and 123, are obtained respectively through make contacts 141, 142, and 143 which are closed by the rotation of cams 151, 152, and 153 respectively. FIG. 2 shows the ringing and silent intervals of each of the ringing outputs AR, BR, and CR of generator 140. The active portion of the ringing output is shown shaded. The control signal outputs A, B, and C Of FIG. 2 will be explained hereafter.

To provide the immediate ringing feature of the present invention, phase selection circuit 190 is provided. Circuit 190, operating under control of the control signals A, B, and C modifies the arbitrary prior art manner in which selector 110 was permitted to select trunks 117—119 and, correspondingly, connector subgroups 121—123. Phase selection circuit 190 responds to the phase-displaced control signals A, B, and C by grounding the sleeve leads of those trunks in trunk groups 117, 118 or 119 which are associated with connectors in groups 121—123 which would be in the silent portion of their ringing output from generator 140 when the connector completed its response to the tens and units digits of the called number.

The relationship between the ringing signals AR, BR, and CR and the control signals A, B, and C is shown in FIG. 2. Each control signal, such as A, is phase-displaced with respect to its associated active phase ringing signal AR so that the respective A relay in phase selection circuit 190 will be released by the high portion of cam 171 interrupting contact 181 sometime before the corresponding high portion of cam 151 makes a ringing output in the active portion of its cycle available to its respective connector group 121. This phase displacement is shown by the symbols $\tau_A$, $\tau_B$ and $\tau_C$, representing the displacement between the termination of the control signals A, B, and C and the beginning of the active portion of ringing outputs AR, BR, and CR, respectively. This phase displacement represents a time interval equal to the average time for the receipt of two digits and the interdigital pause, together with the time required for the seized connector to respond to the two digits.

In the illustrative embodiment shown in FIG. 1 it is assumed that the average time interval for a connector to respond to the last two digits of a called number is approximately 180° of cam rotation. This approximation assumes that there is an equal probability that any of the digits zero to nine may be selected for each of the tens and units digits of the called number. Since the digit one is the shortest digit while digit zero takes the longest amount of time, the average response time for the connector is taken as the time required for a connector to respond to the digit five in each of the tens and units position of a called number. In the illustrative embodiment this is assumed to be 180°, i.e., slightly longer than the 120° interval of the active portion of the ringing output. Thus, the relationship between cams 171—173 and 151—153 is such that active phase ringing provided by the high point of cams 151—153, follows 180° after the termination of the control signal output provided by the high point of cams 171—173. In this context, the output signal from cams 171—173 is the interruption of ground which is normally applied to contacts 181—183 occasioned by the passage of the high point of each of cams 171—173 underneath the respective cam follower contacts. The output signal A (the interruption of ground provided by cam 171) permits relay A and its corresponding make contact A–1 to be released, thereby removing ground from the sleeve conductors of trunk group 119.

At the instant of rotation of cams 171—173 and 151—153 shown in FIG. 1 it is seen that cam 153 has just started making ringing phase CR active (available to the connectors in group 123), while cam 152 has just finished making ringing phase BR active (available to connector group 122). Cam 151 is shown approximately midway in the silent interval of ringing output AR. At the same time, cam 172 is approximately halfway through providing control signal B to release relay B in phase selection circuit 190 while cams 171 and 173 are maintaining relays A and C operated. The operation of relays A and C at their respective make contacts A–1 and C–1 causes ground to be applied to the sleeve conductors of all the trunks in trunk groups 117 and 119, thereby preventing selector 110 from selecting any trunks in these groups.

From the foregoing it is seen that relays A, B, and C are controlled by cams 171—173 selectively to apply and remove ground from the sleeve conductors of the trunks in trunk groups 117—119 so that only those trunks associated with connectors which will have an active ringing phase available at the completion of response to the tens and units digits may be selected by selector 110. However, it may happen that there are no idle trunks in the group that would normally be dictated solely by operation of cams 171—173. Under these circumstances it is desirable to permit an idle connector to be selected even if it will not have active phase ringing available at the completion of its response. To permit such selection, the sleeve leads from connector groups 121—123 are connected to respective inputs of AND gates 191—193. In addition, each of these AND gates has an input lead 175—177 arranged to be grounded by a respective contact 161—163 of cams 171—173. If, for example, all of the connectors of group 122 are busy, the ground normally appearing on their sleeve conductors will ground all of the upper group of inputs to AND gate 192. Cam 172, which is shown having removed ground from relay B, applies ground to terminal 162 and lead 176. AND gate 192 now has all of its inputs grounded and its output, applied through OR gate 195, operates relay ACB. Relay ACB operates and at its operated break contacts ACB–1 and ACB–3 releases relays A and C. The release of relays A and C at their released make contacts A–1 and C–1 removes the artificial busying ground from their sleeve leads and now trunks in trunk groups 117 and 119 may be selected.

Figure 3:
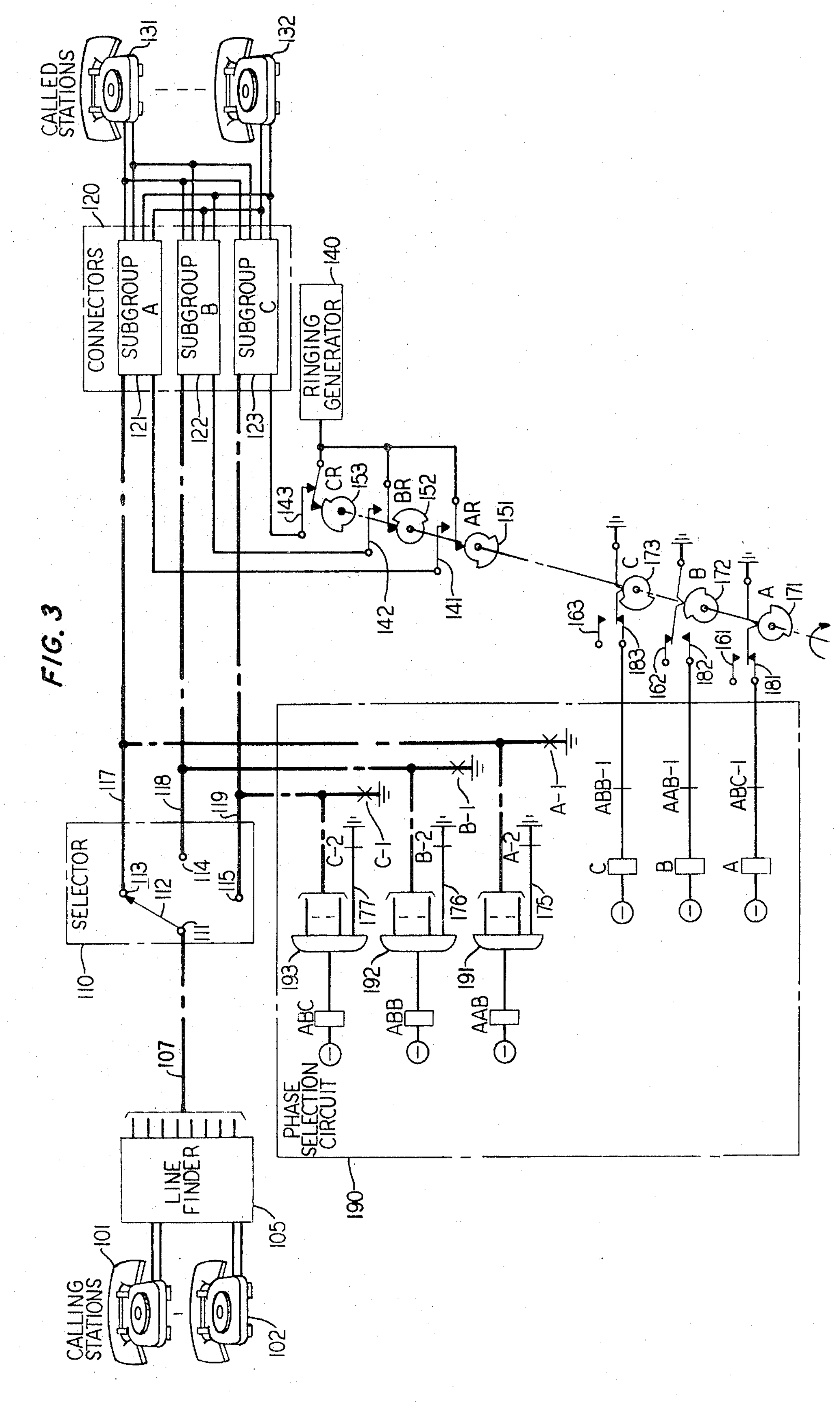
FIG. 3 shows an alternative embodiment for providing immediate ringing in accordance with my invention.

If it were desired, rather than removing the artificial busy from both trunk groups 117 and 119 when the trunks of group 118 are actually busy, a second preference can be made. This modification to the basic circuit described above is shown in FIG. 3. The changes involved appear within phase selection circuit 190. Specifically, the enabling leads 175, 176 and 177 to AND gates 191, 192 and 193, respectively, are no longer grounded through cam operated make contacts 161, 162, and 163, but are instead grounded through break contacts A–2, B–2, and C–2 of relays A, B, and C respectively. Under normal operating circumstances, the grounding of the enabling leads 175, 176, and 177 would occur at substantially the same time under either arrangement. Since the operation of the cam that closed the make contact (contact 162 on lead 176 for example) to ground the enabling lead also released the associated relay (relay B for example) in the earlier arrangement, it is apparent that grounding the enabling lead instead through the released break contact of the associated relay (relay B for example) would occur at substantially the same time.

The noticeable difference in the two arrangements occurs when all trunks in the "preferred" connector subgroup are actually busy. The outputs from AND gates 191, 192, and 193 are no longer combined in an OR gate to operate a single relay. Instead, each AND gate has an individual relay connected to its output. The relays, AAB, ABB, and ABC, operated respectively under control of AND gates 191, 192, and 193, control the release of relays B, C, and A through respective break contacts AAB–1, ABB–1, and ABC–1.

To illustrate, let it be assumed that subgroup B is the preferred group and all the connectors of the subgroup are actually busy, thereby grounding the trunks of trunk group 118. Cam 172 interrupts the operating path for relay B by opening break contact 182 to ground. The release of relay B removes the artificial busy ground from trunk group 118 by releasing make contact B–1. At the same time, ground is applied to enabling lead 176 through break contact B–2. Since trunk group 118 is grounded by being actually busy, all inputs to AND gate 192 are grounded which results in the output of AND gate 192 being grounded. With the output of AND gate 192 grounded, relay ABB is operated. Relay ABB operated causes relay C to release by interrupting its operating path at break contact ABB–1. The release of relay C removes the artificial busy ground from trunk group 119 by opening the path to ground at make contact C–1. This makes subgroup C the "preferred" subgroup and permits the seizure of a "second choice" alternative, a connector having CR phase ringing. While this is not the "preferred" phase for providing immediate ringing to the completed connection, since CR ringing is active immediately following the "preferred" BR ringing, it is the more immediate of the two remaining phases with BR ringing unavailable.

If trunk group 119 is also busy, the release of relay C will enable AND gate 193 by grounding lead 177 through break contact C–2. With all inputs to AND gate 193 grounded, its output will be grounded, thereby operating relay ABC. The operation of relay ABC causes the release of relay A by interrupting its operating path at break contact ABC–1. This permits the seizure of the "third-choice," a connector in subgroup A.

It is to be understood that the foregoing embodiments merely illustrate the principles of my invention. Other arrangements may be devised by those skilled in the art which do not depart from the spirit and scope of this invention. For example, although a system employing a three-phase ringing generator connected to three subgroups of connectors was described, it should be apparent that any number of ringing phases and corresponding connector subgroups could be used and such a system may employ any ratio of active to silent interval of ringing output. In addition, the embodiment described depicted an intraoffice call, or at least a call originating in a step-by-step central office. The principles of my invention are equally applicable to interoffice calls where the calling party is served by a crossbar or electronic switching office. Finally, although the described system shows a step-by-step termination, the invention could be as readily used in any system where ringing is connected through a junctor circuit to the called line.

I claim:

1. In a telephone system;
- a plurality of telephone lines;
- a telephone switching train including a selector and a group of connectors divided into a plurality of subgroups, said selector being arranged to seize an idle one of said connectors to complete a call to one of said lines,
- first means for applying a different phase ringing output to each of said plurality of connector subgroups; and
- second means for applying to each of said plurality of connector subgroups a control signal, phase-displaced with respect to said ringing output applied to said subgroup, to sequentially and artificially busy said connector subgroups to said selector, said second means being arranged so that all of said subgroups are not artificially busied simultaneously.

2. In a telephone system according to claim 1, the combination wherein said phase displacement of said control signal from each phase ringing output is equal to the average time taken by one of said connectors to complete a call to one of said lines.

3. In a system in accordance with claim 1 the combination further including additional means effective when all the connectors of one subgroup are busy for inhibiting said second means.

4. In a telephone system according to claim 1 the combination wherein said means for applying said control signal is connected to apply said control signal to busy all but one of said plurality of connector subgroups at any one time.

5. In a telephone system according to claim 1 the combination wherein said first means includes a ringing generator having a multiphase ringing output and wherein said second means includes a plurality of switches controlled by said ringing generator.

6. In a system according to claim 1, the combination wherein said second means includes means for providing an activating signal when one of said subgroups of connectors is to be rendered available for selection by said selector, and means for inhibiting said control signal including an AND gate individual to each of said plurality of connector subgroups, each said AND gate arranged to be energized when all of the connectors of a respective one of said subgroup of connectors is busy and said activating signal corresponding to said subgroup is provided by said second means.

7. A telephone system comprising a plurality of telephone stations and a switching train for establishing a switching connection to any of said telephone stations, said telephone stations being arranged to present multiple appearances in said switching train,
- means for providing each multiple appearance of a telephone station in said switching network with a different phase ringing signal, each said ringing phase signal having an active and a silent interval output, and
- means for selecting that multiple appearance of a telephone station in said switching train which will have an active interval output from said ringing means when said communication switching connection is extended to said station, said last-mentioned means including multiphase control signal means connected to render busy each of said multiple appearances of said telephone station to which said silent interval output will be connected.

8. In a telephone system,
- a plurality of telephone lines,
- a telephone switching train including a selector and a group of connectors divided into a plurality of subgroups, said selector being arranged to seize an idle one of said connectors to complete a call to one of said lines,
- first means for applying a respective phase ringing output to each of said plurality of subgroups,
- second means for sequentially applying a busy signal to all but one of said subgroups, thereby preventing said selector from seizing a connector in any but said one subgroup, and
- third means effective when all the connectors in said one subgroup are busy for disabling a portion of said second means to remove said busy signal from a second one of said subgroups, thereby permitting said selector to seize a connector in said second subgroup.